Patented May 19, 1925.

1,538,505

UNITED STATES PATENT OFFICE.

FREDERICK C. ATKINSON, OF INDIANAPOLIS, INDIANA.

CHARCOAL AND METHOD OF PREPARING THE SAME.

No Drawing.   Application filed August 16, 1919.   Serial No. 317,904.

*To all whom it may concern:*

Be it known that I, FREDERICK C. ATKINSON, a citizen of the United States, residing at Indianapolis, in the county of Marion and State of Indiana, have invented certain new and useful Improvements in Charcoal and Methods of Preparing the Same, of which the following is a specification.

This invention relates to a method of preparing charcoal for special purposes where mineral matter contained in such charcoal is undesirable and objectionable. Charcoal of very low ash content is desirable in many industries, as in the making of ordinary black gun powder where the various ingredients used in the composition must be carefully regulated and where foreign inorganic matter must be reduced to a minimum.

It is among the objects of this invention to produce a charcoal having a low ash content and which is especially suitable for use in making black powder.

In carrying the objects of my invention into effect I provide a preliminary treatment of the material to be carbonized, which consists essentially in extracting the raw material to remove the soluble inorganic matter before subjecting to a carbonizing process.

Specifically, I have found that by subjecting such waste materials as corncobs, wood chips etc., to extraction with water or steam, or both, a small quantity of acetic and other organic acids is produced which facilitates the extraction of the mineral matters contained in the corncobs or other waste materials. Preferably the extraction is performed in an autoclave under considerable pressure. As a result, there is obtained an extract of considerable value and the residual raw material is suitable for destructive distillation or carbonizing in any well known manner to produce a charcoal of low ash content.

I may accomplish the same result by making the extraction in an open cooker with steam and water at the boiling temperature of water, with or without the use of an inorganic acid, the acid merely facilitating the extraction of mineral matters. But I prefer the method of cooking in a pressure cooker or autoclave as in this way I am enabled to more completely extract the mineral matters in a minimum of time; in addition I obtain an extract that is serviceable as an adhesive and for other purposes, for example as a filler for leather and paper.

The following is a specific example of a process embodying my invention. Crushed corncobs or wood chips, etc., are placed in a pressure cooker or autoclave and completely covered with water. After closing the autoclave, steam is admitted and the contents of the autoclave are heated under a pressure of 40 to 100 pounds steam pressure for two or three hours. The steam is discontinued and the liquor drained off. Preferably a second portion of water is added and the contents again steamed for from a few minutes to an hour or even more. This second liquor may be drained off and the residue pressed to remove the excess of water, after which it is dried as completely as possible in a dryer, such as is ordinarily used for such purposes.

The dried residue I use for carbonizing which may be performed in any type of retort, such as is commonly used for charring wood chips and the like. The resulting charcoal is very low in ash content and is especially suitable for use where a powdered charcoal of a minimum mineral content is desired.

Having thus fully described my said invention, what I claim as new and desire to secure by Letters Patent, is:

1. Charcoal from demineralized corncobs.
2. A method of preparing charcoal which consists in extracting the mineral substances from the raw material with water while preserving its structural form and then carbonizing the same.
3. A method of preparing charcoal which consists in extracting the mineral substances from the raw material with water and steam while preserving its structural form and then carbonizing the same.
4. A method of preparing charcoal which consists in extracting the mineral substances from the raw material with water and steam under pressure while preserving its structural form and then carbonizing the same.
5. A method of preparing charcoal which consists in extracting the mineral substances from the raw material with water and steam under pressure with the addition of an inorganic acid while preserving its structural form and then carbonizing the same.
6. A method of preparing charcoal which consists in extracting the mineral substances from the raw material with water and steam under pressure for a considerable period and then carbonizing the same while preserving the structural form.

7. A method of preparing charcoal which consists in extracting the mineral substances from the raw material with water and steam under pressure for several hours while preserving its structural form and then carbonizing the same.

8. A method of preparing charcoal which consists in extracting the mineral substances from the raw material with steam under pressure, removing the extract, repeating the extraction while preserving its structural form and carbonizing the residue.

9. A method of preparing charcoal which consists in extracting the mineral substances from the raw material with steam under pressure for a considerable period of time, removing the extract, repeating the extraction for a shorter length of time while preserving its structural form and carbonizing the residue.

10. A method of preparing charcoal which consists in extracting the mineral substances from the raw material with water and steam under a pressure of 40 to 100 pounds for several hours, removing the extract, adding more water, repeating the extraction for a shorter length of time while preserving its structural form, drying the residue and carbonizing the same.

11. A method of preparing charcoal which consists in extracting with water the mineral substances in corn-cobs while preserving their structural form and then carbonizing the corn-cobs, substantially as set forth.

In witness whereof, I have hereunto set my hand and seal at Indianapolis, Indiana this 13th day of August, A. D. nineteen hundred and nineteen.

FREDERICK C. ATKINSON. [L. S.]

Witnesses:
H. C. BIERMAN,
M. L. SHULER.